(12) United States Patent
You et al.

(10) Patent No.: US 9,638,941 B2
(45) Date of Patent: May 2, 2017

(54) PHOTONIC CRYSTAL TYPE LIGHT MODULATOR AND 3D IMAGE ACQUISITION APPARATUS EMPLOYING THE SAME

(75) Inventors: Jang-woo You, Yongin-si (KR);
Yong-hwa Park, Yongin-si (KR);
Yong-ho Lee, Incheon (KR);
Chang-kwon Hwangbo, Incheon (KR);
Jin-joo Kim, Incheon (KR)

(73) Assignees: SAMSUNG ELECTRONICS CO., LTD., Suwon-si (KR); INHA Industry Partnership Institute, Incheon (KR)

( * ) Notice: Subject to any disclaimer, the term of this patent is extended or adjusted under 35 U.S.C. 154(b) by 868 days.

(21) Appl. No.: 13/284,405

(22) Filed: Oct. 28, 2011

(65) Prior Publication Data
US 2012/0300038 A1    Nov. 29, 2012

(30) Foreign Application Priority Data

May 24, 2011    (KR) ........................ 10-2011-0049015

(51) Int. Cl.
| | | |
|---|---|---|
| G02F 1/00 | (2006.01) |
| G02F 1/017 | (2006.01) |
| G01S 17/89 | (2006.01) |
| G01S 7/481 | (2006.01) |
| H04N 5/225 | (2006.01) |
| G02F 1/03 | (2006.01) |
| B82Y 20/00 | (2011.01) |

(52) U.S. Cl.
CPC .............. *G02F 1/017* (2013.01); *B82Y 20/00* (2013.01); *G01S 7/4816* (2013.01); *G01S 17/89* (2013.01); *G02F 1/0311* (2013.01); *H04N 5/2258* (2013.01); *G02F 2202/32* (2013.01)

(58) Field of Classification Search
CPC ........ G02F 1/017; G02F 1/0311; G01S 17/89; G01S 7/4816; H04N 5/2258
USPC ...................... 348/46, 47, E13.074; 385/2, 8
See application file for complete search history.

(56) References Cited

U.S. PATENT DOCUMENTS

| | | | | |
|---|---|---|---|---|
| 5,299,289 A | * | 3/1994 | Omae et al. ................. 349/201 |
| 5,477,351 A | * | 12/1995 | Takahara et al. ................. 349/5 |
| 5,726,805 A | | 3/1998 | Kaushik et al. |

(Continued)

FOREIGN PATENT DOCUMENTS

| | | |
|---|---|---|
| JP | 2008-52109 A | 3/2008 |
| JP | 2009-237094 A | 10/2009 |

(Continued)

OTHER PUBLICATIONS

Cheong, B. et., al. "High angular tolerant color filter using subwavelength grating", Applied Physics Letter, vol. 94, 2009, 3 pages total.

(Continued)

*Primary Examiner* — Neil Mikeska
(74) *Attorney, Agent, or Firm* — Sughrue Mion, PLLC

(57) ABSTRACT

A photonic crystal type light modulator is provided. The photonic crystal type light modulator includes: a substrate; a first electrode disposed on the substrate; an active layer disposed on the first electrode, where an optical characteristic of the active layer changes according to application of an electric field; a second electrode disposed on the active layer; and a photonic crystal layer disposed on the second electrode and comprising a 2D grating.

16 Claims, 12 Drawing Sheets

(56) References Cited

U.S. PATENT DOCUMENTS

| | | | |
|---|---|---|---|
| 5,794,628 | A | 8/1998 | Dean |
| 6,100,517 | A | 8/2000 | Yahav et al. |
| 6,331,911 | B1 | 12/2001 | Manassen et al. |
| 6,707,518 | B1 | 3/2004 | Cowan |
| 6,794,628 | B2 | 9/2004 | Yahav et al. |
| 7,016,519 | B1 | 3/2006 | Nakamura et al. |
| 7,095,487 | B2 | 8/2006 | Gonzalez-Banos et al. |
| 7,525,726 | B2 * | 4/2009 | Kise et al. ............ 359/344 |
| 2002/0141031 | A1 * | 10/2002 | Wang et al. ............ 359/260 |
| 2003/0063884 | A1 * | 4/2003 | Smith et al. ............ 385/129 |
| 2003/0161022 | A1 * | 8/2003 | Lazarev ............ G02F 1/035 359/245 |
| 2004/0211901 | A1 * | 10/2004 | Syllaios et al. ......... 250/339.02 |
| 2004/0227455 | A1 * | 11/2004 | Moon ............ G02F 1/01 313/501 |
| 2005/0199510 | A1 * | 9/2005 | Kochergin et al. ............ 205/640 |
| 2006/0039433 | A1 | 2/2006 | Simpson et al. |
| 2008/0049228 | A1 | 2/2008 | Chan |
| 2008/0158550 | A1 * | 7/2008 | Arieli ............ G01N 21/211 356/73 |
| 2009/0008735 | A1 * | 1/2009 | Ogino et al. ............ 257/436 |
| 2009/0067774 | A1 * | 3/2009 | Magnusson ............ 385/10 |
| 2009/0284696 | A1 | 11/2009 | Cheong et al. |
| 2010/0177372 | A1 * | 7/2010 | Park et al. ............ 359/263 |
| 2010/0183042 | A1 * | 7/2010 | Wu et al. ............ 372/45.012 |
| 2010/0295143 | A1 * | 11/2010 | Yokogawa ............ 257/435 |
| 2010/0308211 | A1 * | 12/2010 | Cho et al. ............ 250/214 R |
| 2010/0321755 | A1 * | 12/2010 | Cho et al. ............ 359/248 |
| 2011/0080581 | A1 * | 4/2011 | Bhargava et al. ............ 356/302 |
| 2011/0181936 | A1 * | 7/2011 | Cho et al. ............ 359/260 |
| 2011/0181946 | A1 * | 7/2011 | Magnusson et al. ........ 359/346 |
| 2011/0200319 | A1 * | 8/2011 | Kravitz et al. ............ 396/333 |
| 2011/0237464 | A1 * | 9/2011 | Cunningham et al. ......... 506/39 |
| 2012/0069176 | A1 * | 3/2012 | Park et al. ............ 348/135 |
| 2012/0183250 | A1 * | 7/2012 | Cheben et al. ............ 385/2 |

FOREIGN PATENT DOCUMENTS

| | | |
|---|---|---|
| KR | 10-2009-0118310 A | 11/2009 |
| KR | 10-0991068 B1 | 10/2010 |
| KR | 10-2010-0138147 A | 12/2010 |

OTHER PUBLICATIONS

Ichikawa, H. et., al. "Dynamic guided-mode resonant grating filter with quadratic electro-optic effect" J. Opt. Soc. Am. A/vol. 22, No. 7, Jul. 2005, pp. 1311-1318.

Rosenblatt, A. et., al. "Light modulation with resonant grating-wavelength structures", Optics Letter, vol. 21, No. 19, Oct. 1, 1996, pp. 1564-1566.

Xinyu Zhu et al.; "Analytical Solutions for Uniaxial-Film-Compensated Wide-View Liquid Crystal Displays"; Journal of Display Technology; vol. 2; No. 1; Mar. 2006; pp. 2-20.

Eric B. Grann et al.; "Artificial uniaxial and biaxial dielectrics with use of two-dimensional subwavelength binary gratings"; J. Optical Society of America; vol. 11; No. 10; Oct. 1994; pp. 2695-2703.

Kazuo Fujiura et al.; "KTN Optical Waveguide Technologies with a Large Electro-Optic Effect"; NTT Photonics Laboratories; Aug. 2005; pp. 69-70.

"Design of Novel Hybrid Optical Modulator Incorporating Electro-Optical Polymer Waveguide into Silicon Photonic Crystal"; Hankook Kwanghak Hoeji; vol. 19; No. 3; Jun. 2008; 7 pages total; DOI: 10.3807/HKH.2008.19.3.187.

Thomas K. Gaylord et al.; "Analysis and Applications of Optical Diffraction by Gratings"; Gaylord and Moharam: Optical Diffraction by Gratings; Proceedings of the IEEE; vol. 73; No. 5; May 1985; pp. 894-937.

Jin-long Zhang et al.; "Omnidirectional narrow bandpass filter based on metal-dielectric thin films"; Applied Optics; vol. 47; No. 33; Nov. 20, 2008; pp. 6285-6290.

Uwe D. Zeitner et al.; "Photonic Submicron-Structures: Effective media for high-performance applications"; Optik & Photonik; Advanced Optical Components; No. 2; Jun. 2010; pp. 46-49.

* cited by examiner

PHOTONIC CRYSTAL TYPE LIGHT MODULATOR AND 3D IMAGE ACQUISITION APPARATUS EMPLOYING THE SAME

CROSS-REFERENCE TO RELATED APPLICATION

This application claims priority from Korean Patent Application No. 10-2011-0049015, filed on May 24, 2011, in the Korean Intellectual Property Office, the disclosure of which is incorporated herein in its entirety by reference.

BACKGROUND

Field

Apparatuses consistent with exemplary embodiments relate to photonic crystal type light modulators and 3D image acquisition apparatuses employing the same.

Description of the Related Art

An optical shutter having a function of transmitting or blocking an optical image according to a control signal is widely used in photographing apparatuses such as cameras and in displaying apparatuses such as liquid crystal display (LCD) apparatuses.

With respect to its operating technique, an optical shutter may be a mechanical shutter, as used in cameras, a liquid crystal (LC) shutter, as used in LCDs, a digital micro-mirror device (DMD), as used in projection displays, a spatial light modulator (SLM) based on a micro electromechanical system (MEMS) such as grating light valves (GLVs), or an intensifier- or a semiconductor-based optical shutter, as used in laser radar (LADAR) and 3D cameras.

With respect to the driving principle and shutter speed of its optical shutter, a mechanical shutter is driven by an electro-magnetic motor and generally has shutter time of 1 ms; an LC shutter is driven by a rotational motion of LC which reacts to an electric field and has shutter time of a few ms; an SLM based on MEMS technology drives a fine structure using an electrostatic force and has an operational time of several tens of µs; an image intensifier and semiconductor-based optical shutters are driven by a photoelectric transformation of a semiconductor and have a shutter time of several tens of ns.

Currently, 3D cameras or LADAR technology that record distance information of an object measure a distance between a photographing apparatus and an object being photographed by using a time-of-flight method. According to a shuttered light pulse (SLP) method, which is a type of time-of-flight method, light having a specific wavelength (for example: near infrared (NIR) light with a wavelength of 850 nm) is projected onto an object to be photographed and a light image having the same wavelength reflected from the object to be photographed is shuttered. Then, an image is acquired through an imaging device and distance information is acquired through a series of processes. In order to determine a moving time of the reflected light according to distance, a rapid shutter time of 1 ns is required. Therefore, a high-speed optical image shutter is needed. Accordingly, an image intensifier or a semiconductor based optical shutter is used. However, an image intensifier is high-priced equipment that requires a high voltage and vacuum packaging, and semiconductor based optical shutters are manufactured on GaAs substrates using a semiconductor manufacturing process and have complex structures as compared with a general photo-diode or an LED. Thus, it is difficult to commercialize a semiconductor based optical shutter due to its price and the difficulty of manufacturing it.

SUMMARY

One or more embodiments provide photonic crystal type light modulators and 3D image acquisition apparatuses employing the same.

According to an aspect of an exemplary embodiment, a photonic crystal type light modulator includes: a substrate; a first electrode disposed on the substrate; an active layer disposed on the first electrode, where an optical characteristic of the active layer changes according to application of an electric field; a second electrode disposed on the active layer; and a photonic crystal layer disposed on the second electrode and comprising a 2D grating.

The optical characteristic may be a refractive index of the active layer which changes according to application of an electric field. The active layer may include any one of KTN, $LiNbO_3$, PZT, PLZT, and liquid crystal.

The active layer may include a material that changes light absorption rate when an electric field is applied. The active layer may include a multiple quantum well (MQW) structure using an III-V group semiconductor.

The photonic crystal layer may include a plurality of nano-sized unit blocks arranged two-dimensionally.

A wavelength band of light incident on the photonic crystal type light modulator may be reflected or transmitted according to the application of the electric field, a size, a form, and a material of the unit blocks, intervals between the unit blocks, and a material for forming the active layer.

A cross-sectional shape of the unit blocks may be a regular polygon or circle.

The unit blocks may include first unit blocks and second unit blocks alternately arranged, where a cross-sectional shape of the first unit blocks is different from a cross-sectional shape of the second unit blocks.

An interval between the unit blocks may be greater than or equal to 50 nm and less than or equal to 1000 nm.

The unit blocks may include a crystal, a compound, or an organic material having a refractive index greater than about 1.4.

The unit blocks may include Si, SiC, ZnS, AlN, GaTe, AgI, $TiO_2$, SiON, or a synthetic product thereof.

The unit blocks may be indentations engraved into the photonic crystal layer.

The substrate may include a material which is transparent in a near infrared ray band.

The first electrode and the second electrode each may include a transparent conductive material.

According to an aspect of another exemplary embodiment, a 3D depth image photographing apparatus includes: a lighting unit which irradiates light onto an object; an objective lens which focuses light reflected from the object; the photonic crystal type light modulator, described above, which modulates light transmitted by the objective lens; a sensor which senses an optical signal modulated by the photonic crystal type light modulator; and an operation unit which calculates depth image information of the object based on the signal sensed by the sensor.

The lighting unit may include an optical source which emits light in a near infrared ray band. The apparatus may further include a narrow bandpass filter, disposed on an optical path between the objective lens and the photonic crystal type light modulator, which only transmits light in a near infrared ray band.

According to an aspect of another exemplary embodiment, a 3D image acquisition apparatus includes: a lighting unit which irradiates light onto an object; an objective lens which focuses light reflected from the object; a first image sensor which forms a color image signal of the object from visible light received from the objective lens; the photonic crystal type light modulator which modulates infrared light received from the objective lens; a second image sensor which forms a depth image signal of the object from light modulated by the photonic crystal type light modulator; and an image processor which generates a 3D image of the object based on from the color image signal and the depth image signal.

The apparatus may further include a beam splitter which directs visible light from the objective lens to the first image sensor and directs infrared light from the objective lens to the second image sensor.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
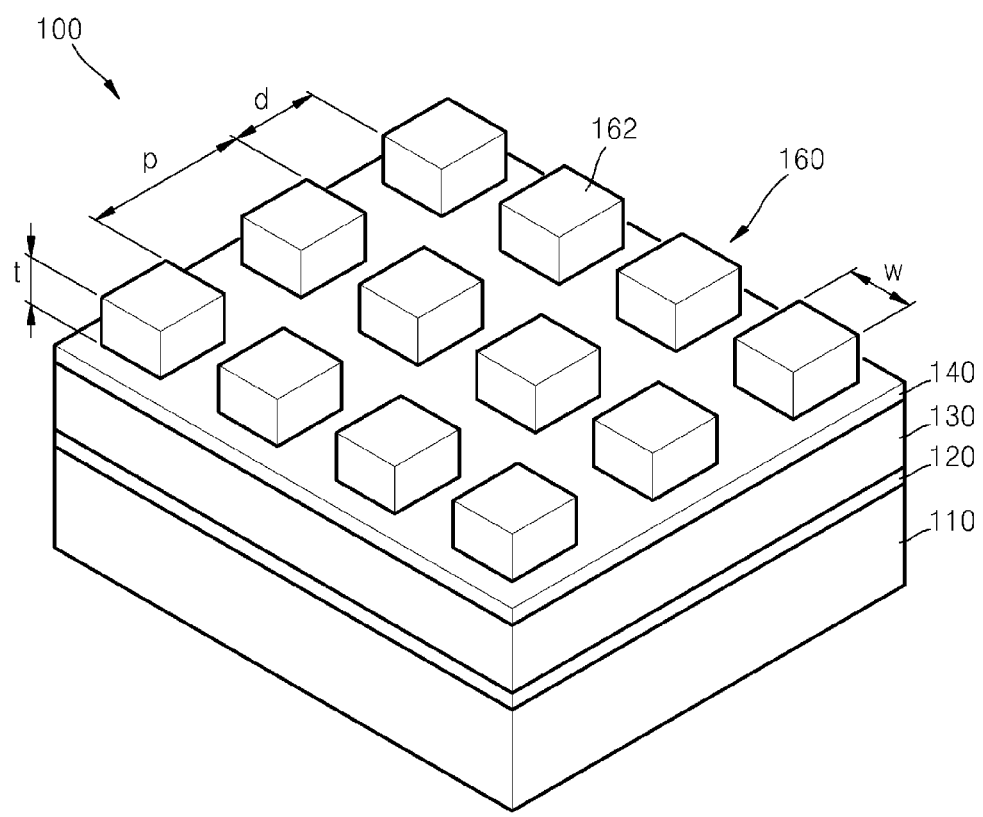
FIG. 1 schematically illustrates a photonic crystal type light modulator according to an exemplary embodiment.

Hereinafter, one or more exemplary embodiments will be described in detail with reference to the accompanying drawings. In the drawings, like reference numerals denote like elements and sizes of each element may be exaggerated for clarity and convenience of description.

FIG. 1 schematically illustrates a photonic crystal type light modulator 100 according to an exemplary embodiment.

Referring to FIG. 1, the photonic crystal type light modulator 100 includes an active layer 130 formed of a material, which has an optical characteristic which changes according to application of an electric field thereto, a first electrode 120 and a second electrode 140 to which a voltage is applied to form an electric field in the active layer 130, and a photonic crystal layer 160 formed as a 2D grating.

The photonic crystal layer 160 has a property such that only light in a specific wavelength band is reflected or transmitted according to a periodic arrangement of the refractive index. In the current embodiment, the active layer 130, formed of a material having an optical characteristic which changes according to application of an electric field, is employed so that light in a specific wavelength band may be on/off modulated, and thus the photonic crystal type light modulator 100 may be rapidly modulated.

Exemplary detailed structures and materials are as follows.

The photonic crystal type light modulator 100 includes a substrate 110, a first electrode 120 formed on the substrate 110, an active layer 130 formed on the first electrode 120, a second electrode 140 formed on the active layer 130, and a photonic crystal layer 160 formed on the second electrode 140.

The substrate 110 may include an optically transparent material and may be, for example, a sapphire substrate, a glass substrate, a silicon substrate, or a III-V group GaAs substrate. The material for forming the substrate 110 may be selected according to a wavelength band of light to be modulated in the photonic crystal type light modulator 100, or a reflective type or a transmissive type of the photonic crystal type light modulator 100. For example, when the photonic crystal type light modulator 100 is to be employed in a 3D depth image photographing apparatus, the substrate 110 may be formed of a material which is transparent in a near infrared ray band.

The active layer 130 may be formed of a material having a refractive index which changes when an electric field is applied, that is, a material showing an electro-optic (EO) effect. Such a material changes the wavelength of resonating light according to the intensity of an applied electric field. For example, the active layer 130 may include any one of KTN, $LiNbO_3$, PZT, PLZT, and liquid crystal.

Also, the active layer 130 may be formed of a material having a light absorption rate which changes when an electric field is applied, that is, a material showing an electro-absorption effect. For example, the active layer 130 may have a multiple quantum well (MQW) structure using an III-V group semiconductor. According to the application of an electric field, an absorption wavelength in the MQW may be shifted.

The first electrode 120 and the second electrode 140 are disposed so as to form an electric field in the active layer 130 when a voltage is applied, and may be formed of a transparent conductive material.

The photonic crystal layer 160 is formed by arranging a plurality of nano-sized unit blocks 162 into an array having a predetermined two-dimensional period. The photonic crystal layer 160 has a sub-wavelength grating (SWG) structure and intervals between the unit blocks 162 may be about 100 nm to about 1000 nm. However, exemplary embodiments are not limited thereto and the intervals may vary. The unit blocks 162 may each be formed of a crystal, a compound, or an organic material, which may have a refractive index greater than 1, for example, greater than about 1.4. For example, the unit blocks 162 may each be formed of Si, SiC, ZnS, AlN, GaTe, AgI, $TiO_2$, SiON, or a synthetic product thereof. Each of the unit blocks 162 may have a cross-section shape in the form of a regular polygon, a circle, or a square as illustrated in FIG. 1.

A wavelength band of light selectively reflected or transmitted by the photonic crystal type light modulator 100 may be determined by sizes w and t, the form, and the material of the unit blocks 162, intervals d between the unit blocks 162, the material of the active layer 130, and the electric field formed in the active layer 130.

More specifically, light in a wavelength band is guided in the active layer 130 due to the nano-sized periodic grating structure formed by the unit blocks 162 of the photonic crystal layer 160 and light in a specific wavelength band is transmitted or reflected by the active layer 130, which is called guided mode resonance (GMR). Here, a grating interval, that is, an interval between the unit blocks 162, may be adjusted to adjust the specific wavelength band that is transmitted or reflected by the active layer 130. Since the active layer 130 is formed of a material having an optical characteristic which changes according to application of an electric field, the specific wavelength band transmitted or reflected according to the electric field applied to the active layer 130 may be adjusted. For example, voltages applied to the first electrode 120 and the second electrode 140 disposed on both surfaces of the active layer 130 are adjusted by a controller (not illustrated) and applied so that the photonic crystal type light modulator 100 may on/off modulate light in a specific wavelength band.

Figure 2:
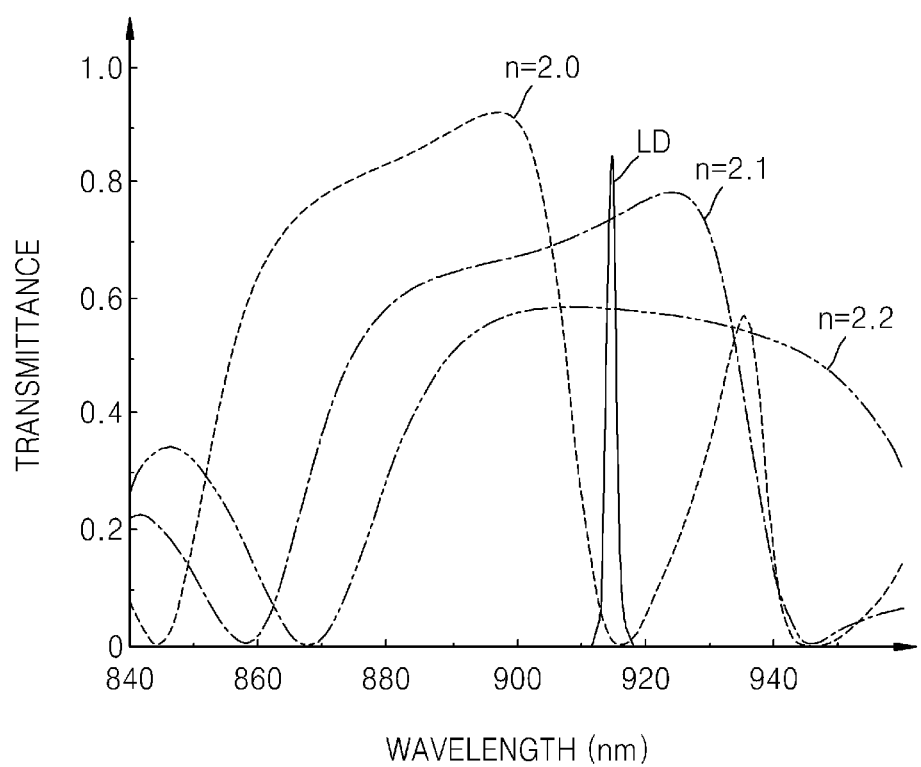
FIG. 2 is a simulation graph showing that the photonic crystal type light modulator of FIG. 1 may turn on/off light in a specific wavelength band according to application of an electric field.

FIG. 2 is a simulation graph showing that the photonic crystal type light modulator 100 may turn on/off light in a specific wavelength band according to the application of an electric field.

In the graph, in the photonic crystal type light modulator 100, pitches p between the unit blocks 162 are each 500 nm, widths w of the unit blocks 162 are each 250 nm, the thicknesses t of the unit blocks 162 is 370 nm, the unit blocks 162 are formed of silicon (Si), and the active layer 130 is formed of KTN having a thickness of 300 nm. Since a refractive index of the active layer 130 is changed to 2.0, 2.1, and 2.2, the wavelength band of light that is transmitted in the photonic crystal type light modulator 100 is changed. More specifically, when a refractive index is 2.0, the photonic crystal type light modulator 100 may function in an off mode, and when a refractive index is 2.1, the photonic crystal type light modulator 100 may function in an on mode with respect to light having a wavelength of about 915 nm irradiated from the LD.

Figure 3A:
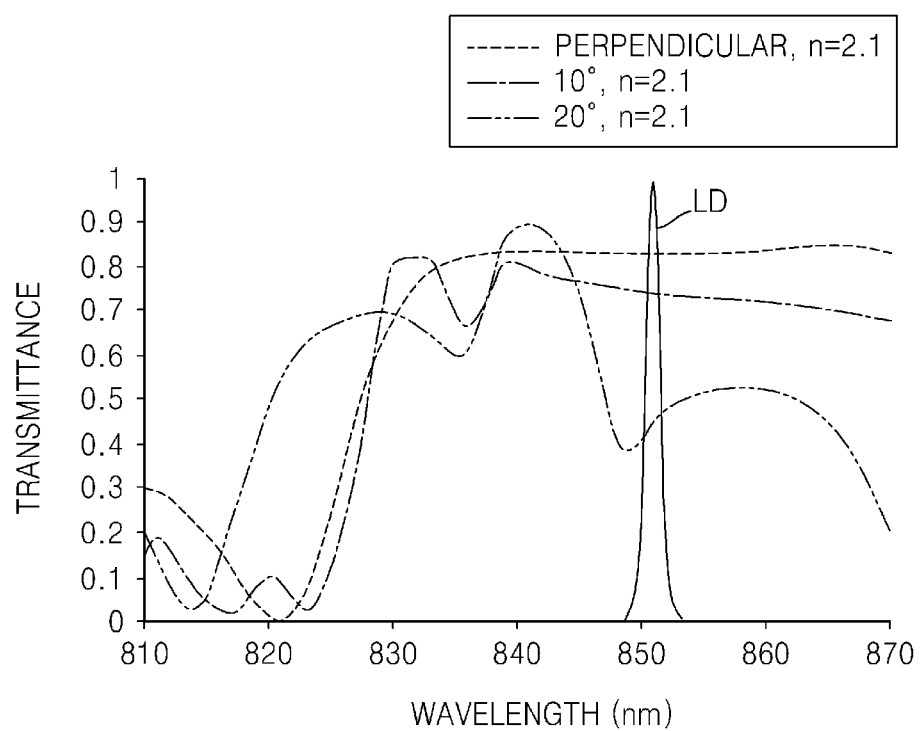
FIGS. 3A and 3B are simulation graphs showing that the photonic crystal type light modulator of FIG. 1 is insensitive to an incident angle when the photonic crystal type light modulator of FIG. 1 is in an on/off modulated state with respect to light in a specific wavelength band.
Figure 3B:
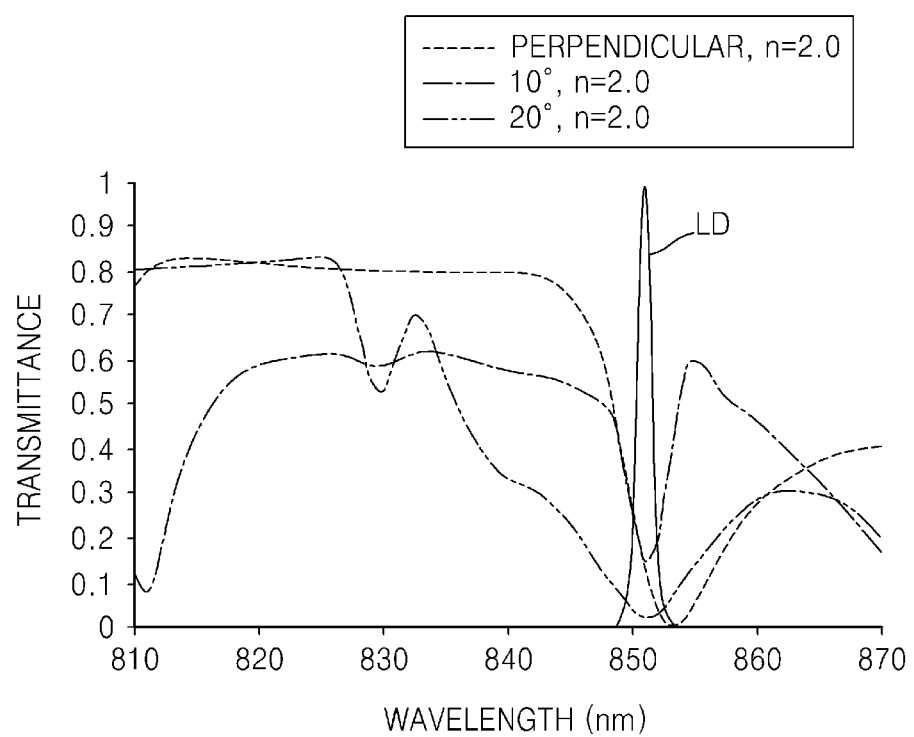

FIGS. 3A and 3B are simulation graphs showing that the photonic crystal type light modulator 100 is insensitive to an incident angle of the light when the photonic crystal type light modulator 100 is in an on/off modulated state with respect to light in a specific wavelength band.

In the graph, in the photonic crystal type light modulator 100, pitches p between the unit blocks 162 are each 460 nm, widths w of the unit blocks 162 are each 240 nm, thicknesses t of the unit blocks 162 are 370 nm, the unit blocks 162 are formed of silicon (Si), and the active layer 130 is formed of KTN having a thickness of 270 nm.

In FIG. 3A, the photonic crystal type light modulator 100 is driven in an on mode with respect to light having a wavelength of about 850 nm irradiated from the LD when a refractive index of the active layer 130 is 2.1. When light is perpendicularly incident onto the photonic crystal type light modulator 100, that is, when an incident angle is 0°, when an incident angle is 10°, and when an incident angle is 20°, the photonic crystal type light modulator 100 has an excellent transmittance property and maintains an on mode.

In FIG. 3B, the photonic crystal type light modulator 100 is driven in an off mode with respect to light having a wavelength of about 850 nm irradiated from the LD when a refractive index of the active layer 130 is 2.0. When light is perpendicularly incident onto the photonic crystal type light modulator 100, that is, when an incident angle is 0°, when an incident angle is 10°, and when an incident angle is 20°, the photonic crystal type light modulator 100 has a low transmittance property and maintains an off mode.

Figure 4A:
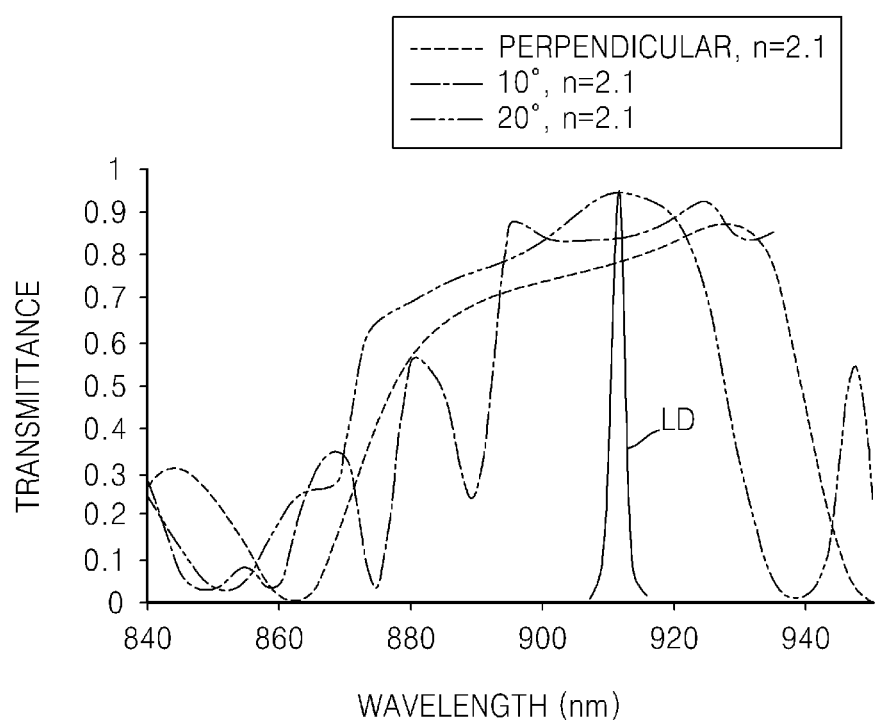
FIGS. 4A and 4B are simulation graphs showing that the photonic crystal type light modulator of FIG. 1 is insensitive to an incident angle when the photonic crystal type light modulator of FIG. 1 is in an on/off modulated state with respect to light in different specific wavelength bands.
Figure 4B:
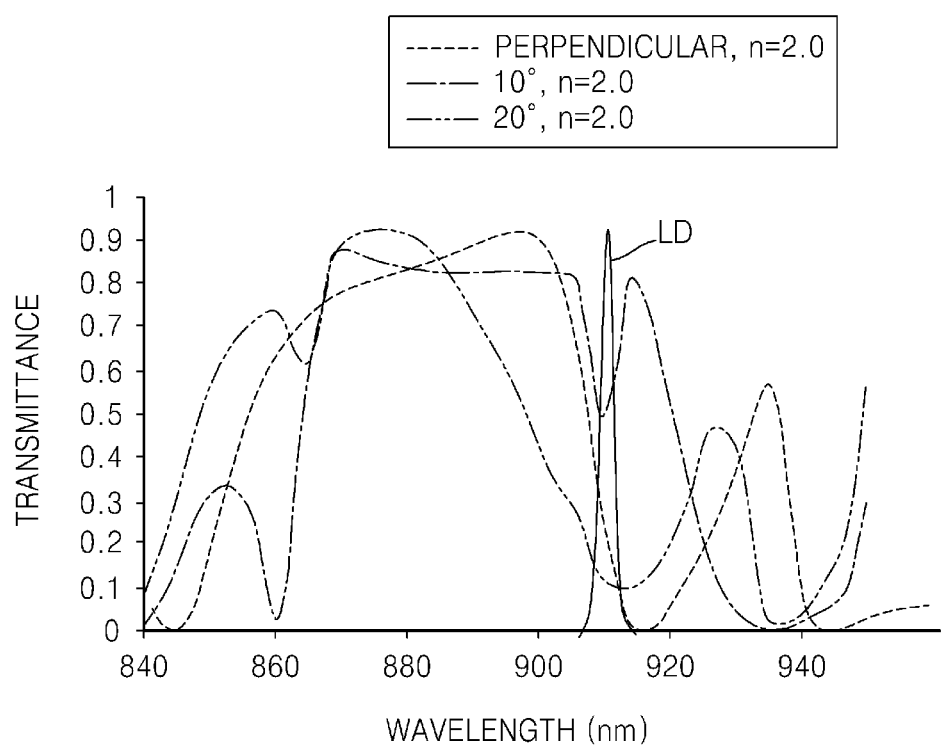

FIGS. 4A and 4B are simulation graphs showing that the photonic crystal type light modulator 100 is insensitive to an incident angle when the photonic crystal type light modulator 100 is in an on/off modulated state with respect to light in different specific wavelength bands.

In the graph, in the photonic crystal type light modulator 100, pitches p between the unit blocks 162 are each 500 nm, widths w of the unit blocks 162 are each 250 nm, thicknesses t of the unit blocks 162 are 370 nm, the unit blocks 162 are formed of silicon (Si), and the active layer 130 is formed of KTN having a thickness of 300 nm.

In FIG. 4A, the photonic crystal type light modulator 100 is driven in an on mode with respect to light having a wavelength of about 916 nm irradiated from the LD when a refractive index of the active layer 130 is 2.1. When light is perpendicularly incident onto the photonic crystal type light modulator 100, that is, when an incident angle is 0°, when an incident angle is 10°, and when an incident angle is 20°, the photonic crystal type light modulator 100 has an excellent transmittance property and maintains an on mode.

In FIG. 4B, the photonic crystal type light modulator 100 is driven in an off mode with respect to light having a wavelength of about 916 nm irradiated from the LD when a refractive index of the active layer 130 is 2.0. When light is perpendicularly incident onto the photonic crystal type light modulator 100, that is, when an incident angle is 0°, when an incident angle is 10°, and when an incident angle is 20°, the photonic crystal type light modulator 100 has a low transmittance property and maintains an off mode.

Figure 5:
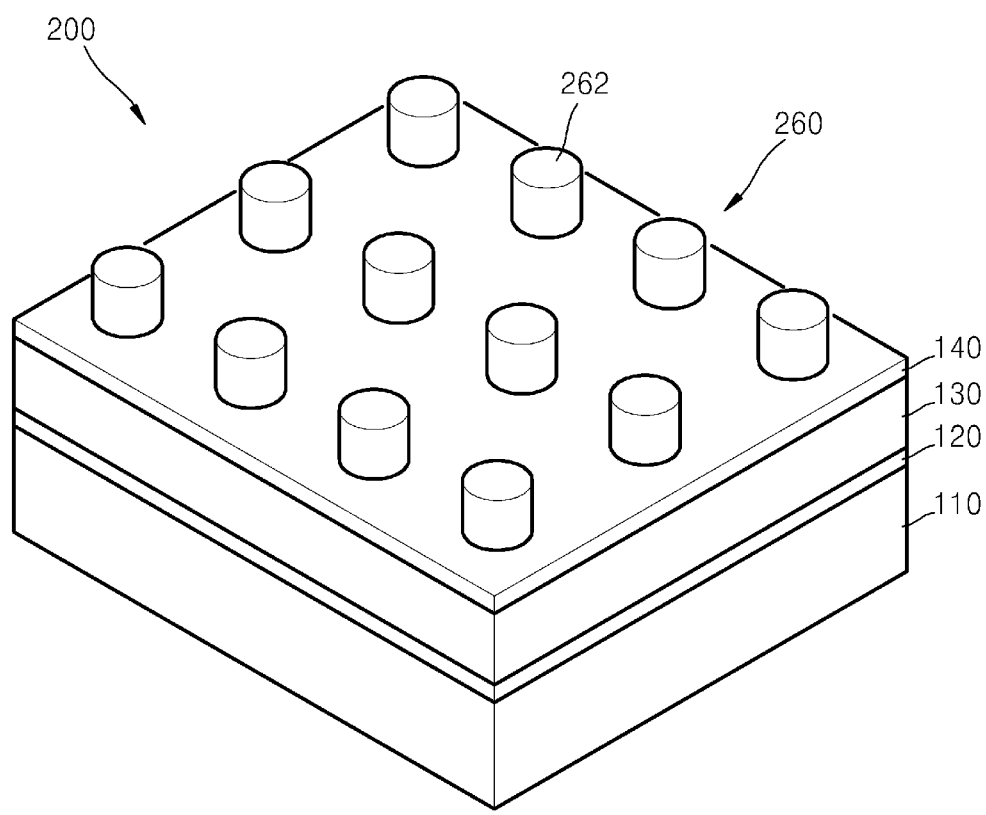
FIG. 5 schematically illustrates a photonic crystal type light modulator according to another exemplary embodiment.

FIG. 5 schematically illustrates a photonic crystal type light modulator 200 according to another exemplary embodiment. The photonic crystal type light modulator 200 according to the current embodiment is different from the photonic crystal type light modulator 100 of FIG. 1 in that the unit blocks 262 included in a photonic crystal layer 260 have cross-section shapes which are circular.

Figure 6:
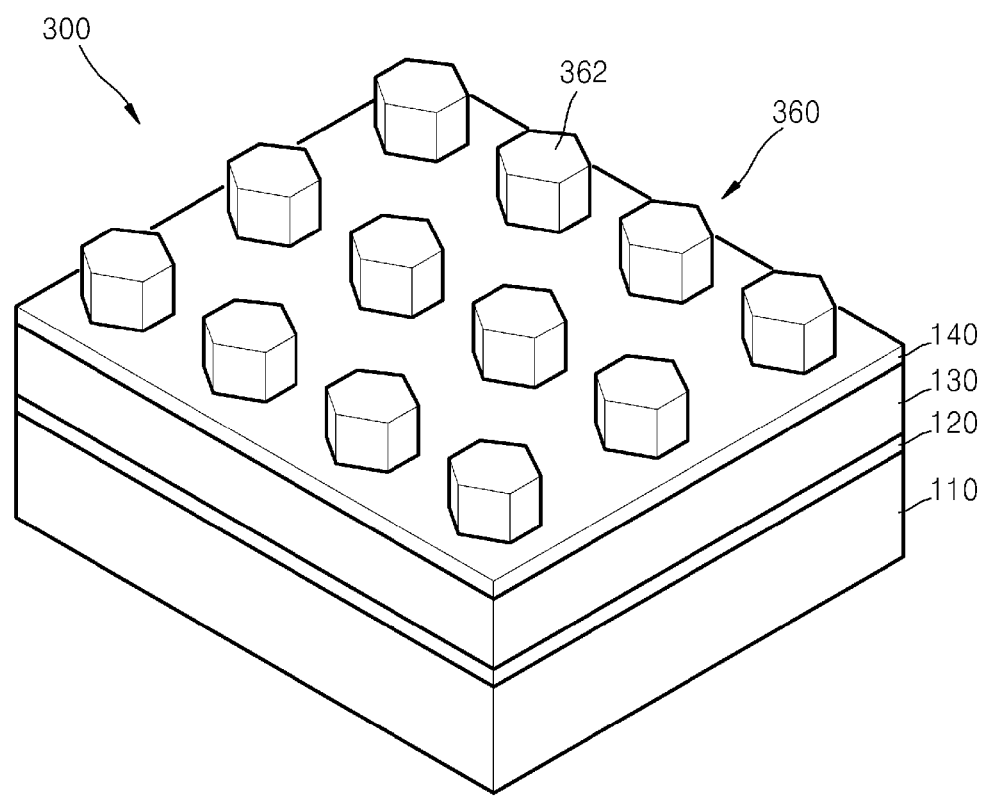
FIG. 6 schematically illustrates a photonic crystal type light modulator according to another exemplary embodiment.

FIG. 6 schematically illustrates a photonic crystal type light modulator 300 according to another exemplary embodiment. In the photonic crystal type light modulator 300, the unit blocks 362 included in the photonic crystal layer 360 have cross-sectional shapes which are regular hexagons.

Figure 7:
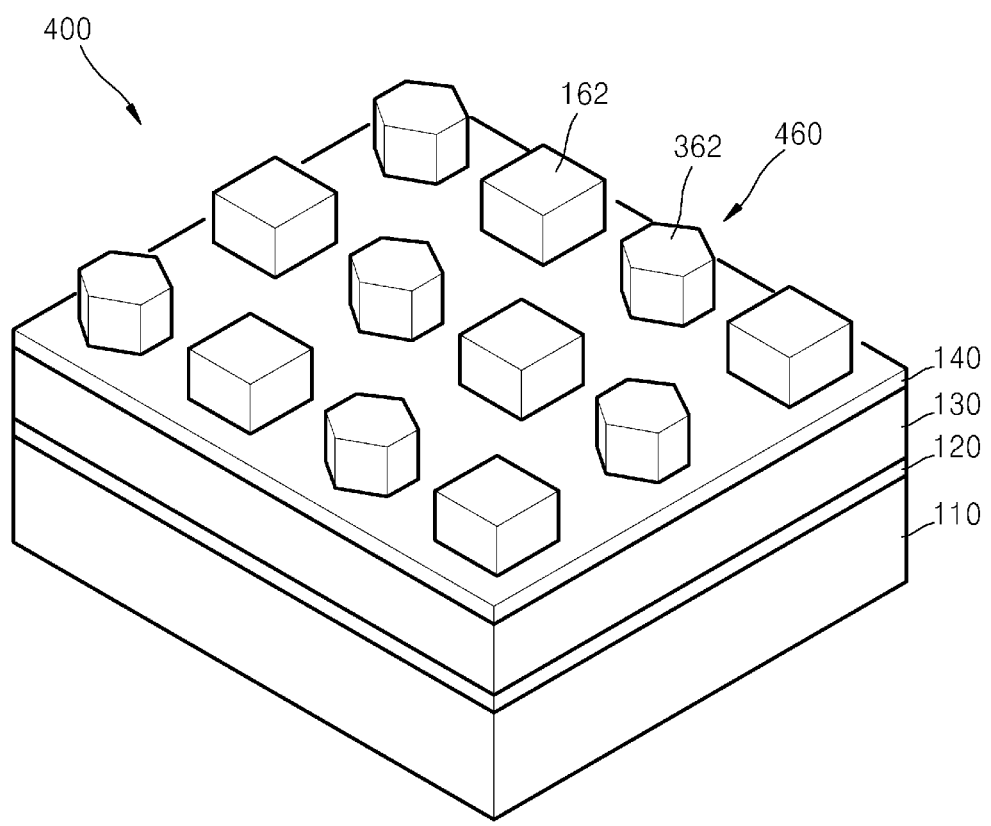
FIG. 7 schematically illustrates a photonic crystal type light modulator according to another exemplary embodiment.

FIG. 7 schematically illustrates a photonic crystal type light modulator 400 according to another exemplary embodiment. In the photonic crystal type light modulator 400, a photonic crystal layer 460 is formed by alternately arranging the unit blocks 162 having square cross-sectional shapes and the unit blocks 362 having hexagonal cross-sectional shapes.

The photonic crystal layers 160, 260, 360, and 460 of FIGS. 1 and 5 through 7 are only examples and may vary. For example, the photonic crystal layer may be divided into multiple areas, and in each divided area of the photonic crystal layer, unit blocks having different forms (e.g. pitch, width, thickness and the like) may be arranged.

Figure 8:
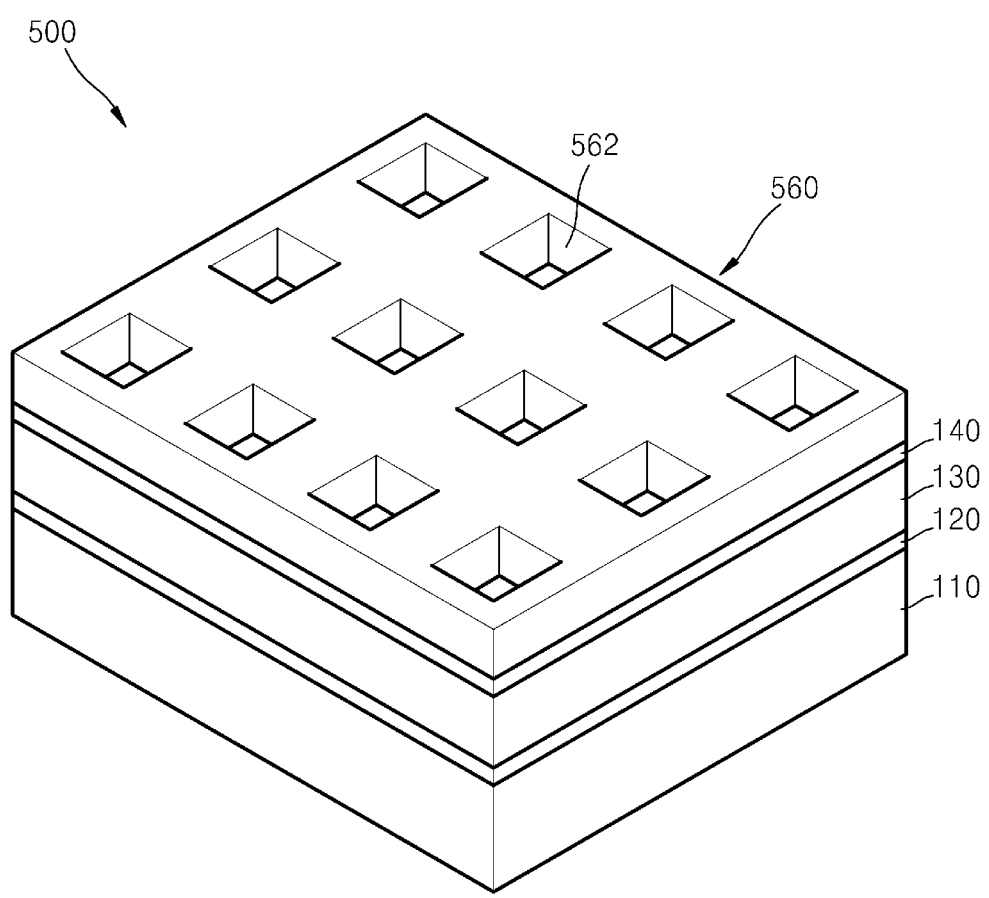
FIG. 8 schematically illustrates a photonic crystal type light modulator according to another exemplary embodiment.

FIG. 8 schematically illustrates a photonic crystal type light modulator 500 according to another exemplary embodiment.

The photonic crystal type light modulator 500 according to the current embodiment is different from the other photonic crystal type light modulators according to the other embodiments in that unit blocks 562 included in the photonic crystal layer 560 are engraved into the photonic crystal layer 560. The cross-sectional shape of the engraved unit blocks 562 is a cube. However, this embodiment is not limited thereto and an engraved form may vary.

The photonic crystal type light modulators described above each employ a photonic crystal structure using a material having an EO effect or an EA effect so that incident light may be rapidly modulated. The photonic crystal type light modulators described above also have a transmittance (or reflection) spectrum that is insensitive to a change of an incident angle. Accordingly, the photonic crystal type light modulators according to exemplary embodiments are appropriate to be used in an imaging optical system. For example, the photonic crystal type light modulator may be employed in a 3D depth image photographing apparatus so as to provide a depth image having improved precision and may be applied in a 3D image acquisition apparatus along with a depth image sensor and a color image sensor so as to provide a high-quality 3D image.

Figure 9:
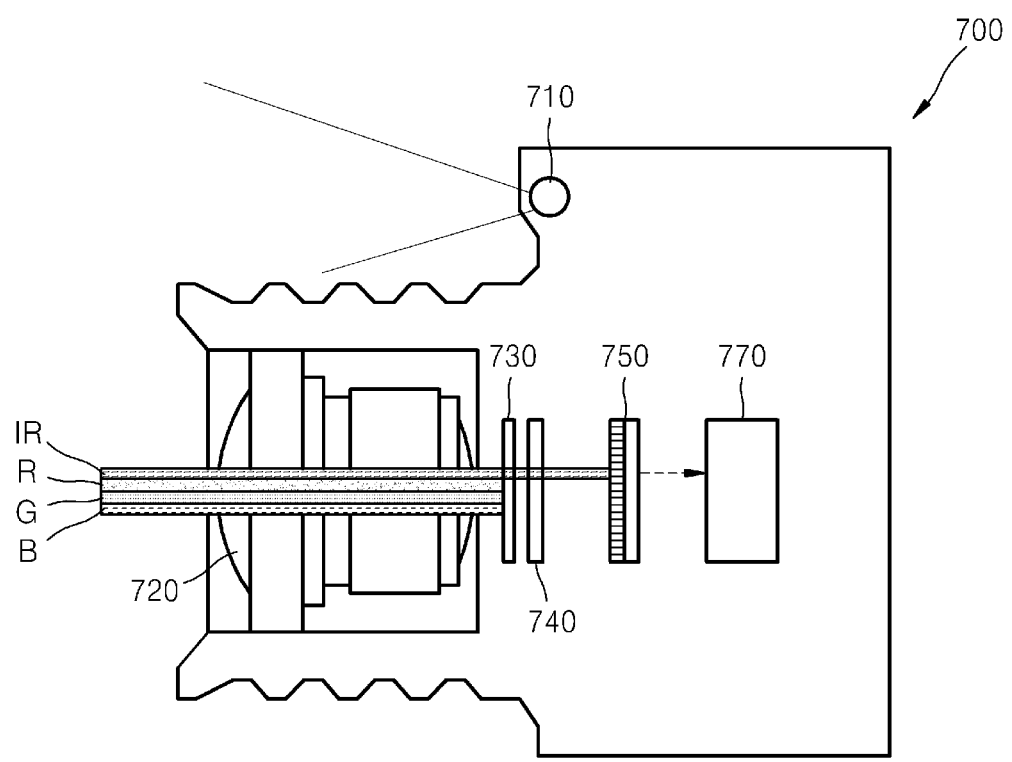
FIG. 9 schematically illustrates a 3D depth image photographing apparatus according to an exemplary embodiment.

FIG. 9 schematically illustrates a 3D depth image photographing apparatus 700 according to an exemplary embodiment.

The 3D depth image photographing apparatus 700 includes a lighting unit 710 irradiating light to an object, an objective lens 720 focusing light reflected from the object, an optical modulator 740 modulating light transmitted by the objective lens 720, a sensor 750 sensing an optical signal modulated in the optical modulator 740, and an operation unit 770 calculating depth image information of the object from the signal sensed in the sensor 750.

The lighting unit 710 may include an optical source that irradiates light IR in a near infrared ray band. The optical modulator 740 may be the photonic crystal type light modulator 100, 200, 300, 400, or 500, and the specific material and size of the optical modulator 740 may be determined so that a modulation wavelength band is to be a wavelength band of light emitted from the lighting unit 710.

In the lighting unit 710, light modulated to have predetermined frequency is irradiated onto an object. The optical modulator 740 is synchronized with the lighting unit 710 and modulates light reflected from the object to have the same frequency and a phase difference. According to such a modulation condition, the operation unit 770 calculates time of flight (TOF) of light from images sensed in the sensor 750 and extracts depth information. That is, light to be incident onto the sensor 750 is rapidly transmitted/blocked by the optical modulator 740 and the operation unit 770 extracts TOF of light from phase delay of a modulated signal, thereby acquiring depth information.

Here, both a method (a homodyne method) of modulating light performed by the optical modulator 740 to have frequency that is the same as a modulation frequency of light emitted from the lighting unit 710 and a method (a heterodyne method) of modulating light to have different frequency may be used.

Also, a narrow bandpass filter 730, which only transmits IR light in a near infrared ray band irradiated from the lighting unit 710, from among red R, green G, blue B, and IR reflected from the object, may be further interposed between the objective lens 720 and the optical modulator 740.

In FIG. 9, an optical arrangement is illustrated in that the optical modulator 740 is designed to be a transmissive type. However, the optical modulator 740 may be designed to be a reflective type, and in this case, the optical arrangement may be changed so that light reflected from the optical modulator 740 may be incident onto the sensor 750.

Figure 10:
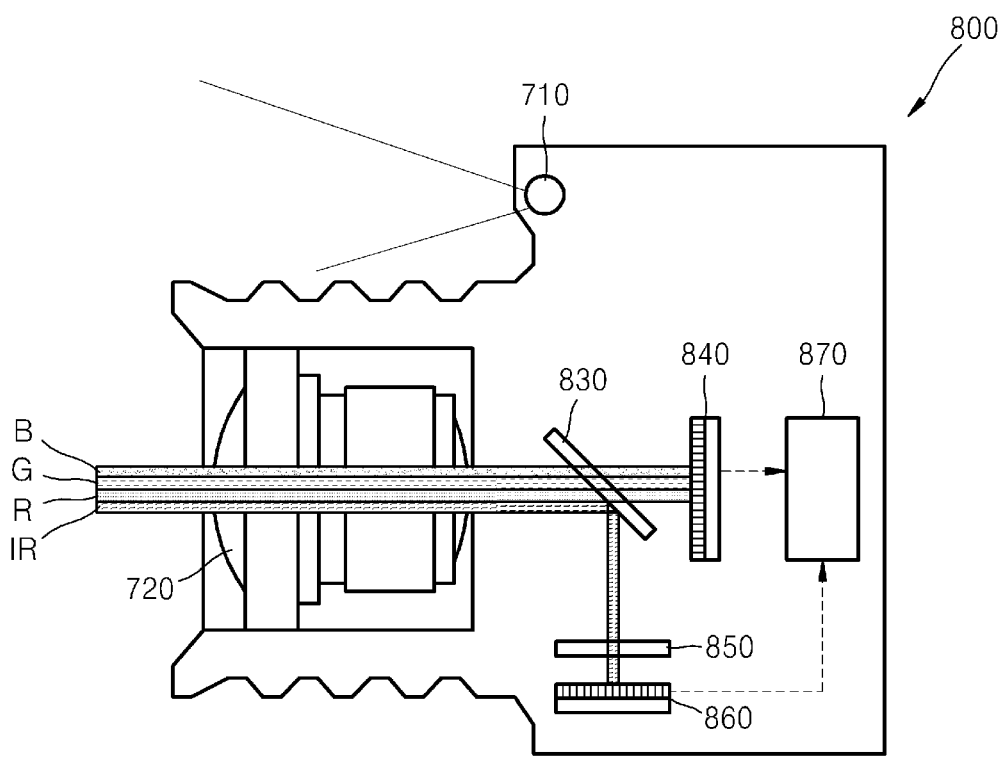
FIG. 10 schematically illustrates a 3D image acquisition apparatus according to an exemplary embodiment.

FIG. 10 schematically illustrates a 3D image acquisition apparatus 800 according to an exemplary embodiment.

The 3D image acquisition apparatus 800 includes the lighting unit 710, the objective lens 720, a first image sensor 840, an optical modulator 850, a second image sensor 860, and an image processor 870, wherein the lighting unit 710 irradiates infrared light onto an object, the objective lens 720 focuses light reflected from the object, the first image sensor 840 forms a color image signal of the object from visible light R, G, and B focused by the objective lens 720, the optical modulator 850 modulates infrared light IR focused by the objective lens 720, the second image sensor 860 forms a depth image signal of the object from light modulated in the optical modulator 850, and an image processor 870 generates a 3D image of the object from the color image signal and the depth image signal formed in the first image sensor 840 and the second image sensor 860, respectively.

The optical modulator 850 may be the photonic crystal type light modulator 100, 200, 300, 400, or 500, and the specific material and size of the optical modulator 850 may be determined so that a modulation wavelength band is to be a wavelength band of light emitted from the lighting unit 710.

Also, a beam splitter 830 may be further disposed on an optical path so that visible light R, G, and B from among light reflected from the object is directed to the first image sensor 840 and infrared light IR is directed to the second image sensor 860.

In FIG. 10, the objective lens 720 is used as a lens for forming a color image and also used as a lens for forming a depth image at the same time. However, exemplary embodiments are not limited thereto and a lens for forming a color image and a lens for forming a depth image may be separately provided.

Also, the optical modulator 850 is illustrated as a transmissive type and thus light transmitted by the optical modulator 850 is incident onto the second image sensor 860. However, exemplary embodiments are not limited thereto. The optical modulator 850 may be a reflective type and an optical arrangement may be changed so that light reflected by the optical modulator 850 may be incident onto the second image sensor 860.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:
1. A photonic crystal type light modulator comprising:
   a substrate;
   a first electrode disposed on the substrate and formed of a transparent conductive material;
   an active layer disposed on the first electrode, wherein a refractive index of the active layer changes according to application of an electric field, the active layer being directly in contact with the first electrode;
   a second electrode disposed on the active layer, the second electrode being directly in contact with the active layer and formed of a transparent conductive material; and a photonic crystal layer disposed on the second electrode, the photonic crystal layer comprising a two-dimensional (2D) grating that has a periodic arrangement of a refractive index,
wherein a transmission wavelength band of the photonic crystal layer changes based on an electric field formed in the active layer by electric voltage applied between the first electrode and the second electrode.

2. The photonic crystal type light modulator of claim 1, wherein the active layer comprises one of KTN, $LiNbO_3$, PZT, PLZT, and liquid crystal.

3. The photonic crystal type light modulator of claim 1, wherein the 2D grating of the photonic crystal layer comprises a plurality of nano-sized unit blocks arranged two-dimensionally.

4. The photonic crystal type light modulator of claim 3, wherein a wavelength band of light incident on the photonic crystal type light modulator is reflected or transmitted according to the application of the electric field, and a wavelength range of the wavelength band of light is determined according to a size, a form, and a material of the unit blocks, intervals between the unit blocks, and a material of the active layer.

5. The photonic crystal type light modulator of claim 3, wherein a cross-sectional shape of each of the unit blocks comprises a regular polygon or a circle.

6. The photonic crystal type light modulator of claim 3, wherein the unit blocks comprise first unit blocks alternately arranged with second unit blocks, wherein a cross-sectional shape of the first unit blocks are different from a cross-sectional shape of the second unit blocks.

7. The photonic crystal type light modulator of claim 3, wherein an interval between the unit blocks is greater than or equal to 8 nm and less than or equal to 3 nm.

8. The photonic crystal type light modulator of claim 3, wherein each of the unit blocks comprises one of a crystal, a compound, and an organic material having a refractive index greater than about 1.4.

9. The photonic crystal type light modulator of claim 3, wherein each of the unit blocks comprises one of Si, SiC, ZnS, AlN, GaTe, AgI, $TiO_2$, SiON, and a synthetic product thereof.

10. The photonic crystal type light modulator of claim 3, wherein the unit blocks comprise indentations engraved into the photonic crystal layer.

11. The photonic crystal type light modulator of claim 3, wherein the substrate comprises a material which is transparent in a near infrared ray band.

12. A three-dimensional (3D) depth image photographing apparatus, the apparatus comprising:
a lighting unit which irradiates light onto an object;
an objective lens which focuses light reflected from the object;
a photonic crystal type light modulator which modulates light transmitted by the objective lens, the photonic crystal type light modulator comprising:
a substrate;
a first electrode disposed on the substrate and formed of a transparent conductive material;
an active layer disposed on the first electrode, wherein a refractive index of the active layer changes according to application of an electric field, the active layer being directly in contact with the first electrode;
a second electrode disposed on the active layer, the second electrode being directly in contact with the active layer and formed of a transparent conductive material; and
a photonic crystal layer disposed on the second electrode, the photonic crystal layer comprising a two-dimensional (2D) grating that has a periodic arrangement of a refractive index, wherein a transmission wavelength band of the photonic crystal layer changes based on an electric field formed in the active layer by electric voltage applied between the first electrode and the second electrode;
a sensor which senses an optical signal modulated by the photonic crystal type light modulator; and
an operation unit which calculates depth image information of the object from the signal sensed by the sensor.

13. The apparatus of claim 12, wherein the lighting unit emits light in a near infrared ray band.

14. The apparatus of claim 13, further comprising a narrow bandpass filter, which transmits light in a near infrared ray band, disposed on an optical path between the objective lens and the photonic crystal type light modulator.

15. A three-dimensional (3D) image acquisition apparatus, the 3D image acquisition apparatus comprising:
a lighting unit which irradiates light onto an object;
an objective lens which focuses light reflected from the object;
a first image sensor which forms a color image signal of the object from visible light received from the objective lens;
a photonic crystal type light modulator which modulates infrared light received from the objective lens, the photonic crystal type light modulator comprising:
a substrate;
a first electrode disposed on the substrate and formed of a transparent conductive material;
an active layer disposed on the first electrode, wherein a refractive index of the active layer changes according to application of an electric field, the active layer being directly in contact with the first electrode;
a second electrode disposed on the active layer, the second electrode being directly in contact with the active layer and formed of a transparent conductive material; and
a photonic crystal layer disposed on the second electrode, the photonic crystal layer comprising a two-dimensional (2D) grating that has a periodic arrangement of a refractive index, wherein a transmission wavelength band of the photonic crystal layer changes based on an electric field formed in the active layer by electric voltage applied between the first electrode and the second electrode;
a second image sensor which forms a depth image signal of the object from light modulated by the photonic crystal type light modulator; and
an image processor which generates a 3D image of the object based on the color image signal and the depth image signal.

16. The apparatus of claim 15, further comprising a beam splitter which directs visible light from the objective lens to the first image sensor and directs infrared light from the objective lens to the photonic crystal type light modulator.

* * * * *